United States Patent
Chang

(10) Patent No.: US 7,463,981 B2
(45) Date of Patent: Dec. 9, 2008

(54) IMAGE EXTRACTION APPARATUS COMPRISING A GPS RECEIVER AND IMAGE PROCESSING METHOD FOR THE SAME

(75) Inventor: Mei-Pin Chang, Taicung (TW)

(73) Assignee: Asia Optical Co., Inc., Taichung (TW)

( * ) Notice: Subject to any disclaimer, the term of this patent is extended or adjusted under 35 U.S.C. 154(b) by 327 days.

(21) Appl. No.: 11/536,213

(22) Filed: Sep. 28, 2006

(65) Prior Publication Data

US 2007/0100547 A1    May 3, 2007

(30) Foreign Application Priority Data

Oct. 26, 2005 (TW) .............................. 94137439 A

(51) Int. Cl.
*G01C 21/00* (2006.01)
(52) U.S. Cl. .................. 701/213; 701/211; 701/212; 340/995.26
(58) Field of Classification Search .............. 701/211, 701/212, 213; 340/995.26
See application file for complete search history.

(56) References Cited

U.S. PATENT DOCUMENTS

| | | | | |
|---|---|---|---|---|
| 4,067,027 A | * | 1/1978 | Yamazaki | ................... 396/432 |
| 4,571,628 A | * | 2/1986 | Thornton | ............... 348/333.08 |
| 6,088,053 A | * | 7/2000 | Hammack et al. | ............. 348/61 |
| 7,298,869 B1 | * | 11/2007 | Abernathy | ................... 382/108 |

* cited by examiner

*Primary Examiner*—Gertrude Arthur Jeanglaud
(74) *Attorney, Agent, or Firm*—Thomas, Kayden, Horstemeyer & Risley

(57) ABSTRACT

An image extraction apparatus comprising a GPS receiver is provided. The apparatus comprises a lens, a sensor, a display device, a storage medium comprising an ecological database, an input device, a GPS receiver, a DSP unit, and a microprocessor. When a shooting signal from the input device is received, the microprocessor enables the sensor to receives an ecological image through the lens and transmits the ecological image to the DSP unit, obtains longitude and latitude corresponding to a current location of the image extraction apparatus through the GPS receiver, retrieves ecological data from the ecological database according to the longitude and latitude, enables the DSP unit to compare the ecological image and the ecological data, and displays comparison results on the display device.

11 Claims, 4 Drawing Sheets

IMAGE EXTRACTION APPARATUS COMPRISING A GPS RECEIVER AND IMAGE PROCESSING METHOD FOR THE SAME

BACKGROUND OF THE INVENTION

1. Field of the Invention

The present invention relates to an image processing apparatus and in particular to an image extraction apparatus comprising a global positioning system (GPS).

2. Description of the Related Art

Generally, bird watching equipment comprises a binoculars and an illustrated handbook. The binoculars facilitate bird observation while illustrated handbooks can aid in category recognition. Illustrated handbooks, however, are typically large and hard to carry.

Apparatuses integrating digital photography and telephotography are disclosed, shooting and storing images in a memory unit, as shown in U.S. Pat. Nos. 4,067,027, 4,571,628, and 6,088,053 patents. Those disclosures, however, can only shoot images but cannot immediately recognize bird categories.

Thus, an image extraction apparatus capable of telephotography and image recognition is desirable.

BRIEF SUMMARY OF THE INVENTION

An image extraction apparatus comprising a GPS receiver is provided. An embodiment of the apparatus comprises a lens, a sensor, a display device, a storage medium comprising an ecological database, an input device, a GPS receiver, a DSP unit, and a microprocessor. When a shooting signal from the input device is received, the microprocessor enables the sensor to receives an ecological image through the lens and transmits the ecological image to the DSP unit, obtains longitude and latitude corresponding to a current location of the image extraction apparatus through the GPS receiver, retrieves ecological data from the ecological database according to the longitude and latitude, enables the DSP unit to compare the ecological image with the ecological data, and displays comparison results on the display device.

An image extraction apparatus comprising a GPS receiver is also provided. An embodiment of the apparatus comprises a lens, a sensor, a display device, a storage medium, an input device, a GPS receiver, a DSP unit, and a microprocessor. When a shooting signal from the input device is received, the microprocessor enables the sensor to receive an ecological image through the lens and transmits the ecological image to the DSP unit, obtains longitude and latitude corresponding to a current location of the image extraction apparatus through the GPS receiver, retrieves ecological data from a remote database according to the longitude and latitude and stores the retrieved ecological data in the storage medium, enables the DSP unit to compare the ecological image with the ecological data, and displays comparison results on the display device.

An image processing method for an image extraction apparatus comprising a GPS receiver is provided. In an embodiment, an image extraction apparatus comprising a GPS receiver is provided. Longitude and latitude corresponding to the image extraction apparatus are obtained through the GPS receiver. Map data and ecological data stored in a database are compared according to the longitude and latitude. Ecological data and map data are downloaded and stored in a storage medium of the image extraction apparatus according to comparison results. The image extraction apparatus is switched from a satellite navigation mode to a shooting mode when a switch signal is received. An ecological image is obtained according to a shooting signal and longitude and latitude corresponding to a current location of the image extraction apparatus are retrieved. Ecological data is retrieved from the storage medium according to the longitude and latitude corresponding to the current location of the image extraction apparatus. The ecological image is compared with downloaded ecological data and comparison results are displayed in a display device.

An image processing method for an image extraction apparatus comprising a GPS receiver is also provided. In an embodiment, an image extraction apparatus comprising a GPS receiver is provided and longitude and latitude corresponding to the image extraction apparatus are retrieved through the GPS receiver. The image extraction apparatus is switched from a satellite navigation mode to a shooting mode when a switch signal is received. An ecological image is obtained according to a shooting signal and longitude and latitude corresponding to a current location of the image extraction apparatus through the GPS receiver. Ecological data is downloaded from a database through the GPS receiver according to the longitude and latitude corresponding to the current location of the image extraction apparatus and stored in a storage medium of the image extraction apparatus. The ecological image is compared with downloaded ecological data and comparison results are displayed in a display device.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
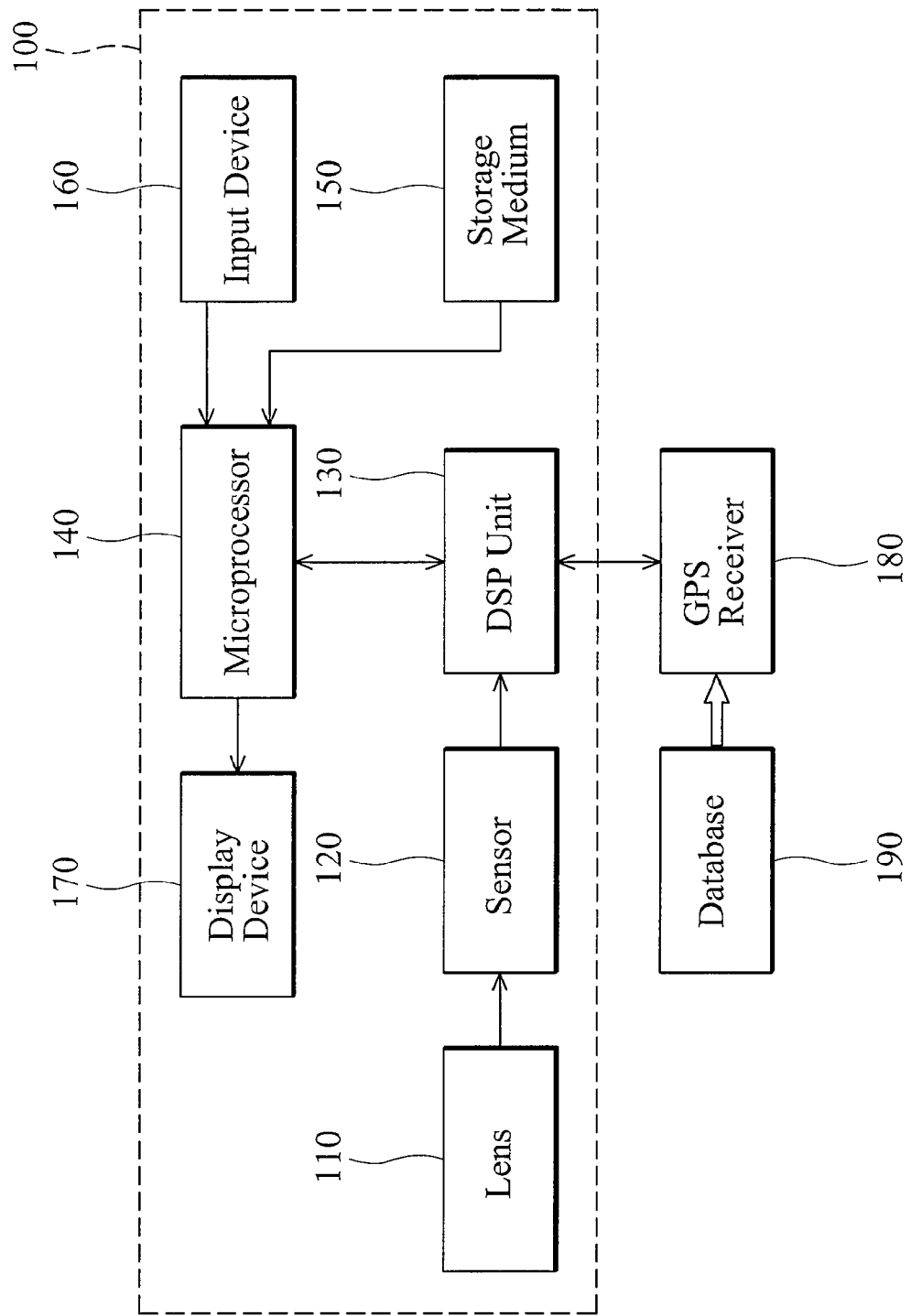
FIG. 1 is a schematic view of an embodiment of the architecture of an image extraction apparatus comprising a GPS receiver.

Several exemplary embodiments of the invention are described with reference to FIGS. 1 through 4, which generally relate to generating an image extraction apparatus. It is to be understood that the following disclosure provides many different embodiments as examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The invention discloses an image extraction apparatus comprising a GPS receiver and an image processing method for the same, providing telephotography and image recognition.

The Global Positioning System (GPS) is a satellite-based navigation system made up of a network of 24 satellites placed into orbit by the U.S. Department of Defense. GPS was originally intended for military applications, but in the 1980s, the government made the system available for civilian use. GPS works in any weather conditions, anywhere in the world, 24 hours a day. There are no subscription fees or setup charges to use GPS. GPS satellites circle the earth twice a day in a very precise orbit and transmit signal information to earth. GPS receivers take this information and use triangulation to calculate the user's exact location. Essentially, the GPS receiver compares the time a signal was transmitted by a satellite with the time it was received. The time difference tells the GPS receiver how far away the satellite is. With distance measurements from a few more satellites, the receiver can determine a position and display it on an electronic map. A GPS receiver must be locked on to the signal of at least three satellites to calculate a 2D position (latitude and longitude) and track movement. With four or more satellites in view, the receiver can determine the user's 3D position (latitude, longitude and altitude). Once the user's position has been determined, the GPS unit can calculate other information, such as speed, bearing, track, trip distance, distance to destination, sunrise and sunset time and more.

An embodiment of the invention integrates a GPS receiver and an electron telescope (an image extraction apparatus), enabling users to retrieve ecological data (such as birds, insects, plants, and the like). The GPS receiver is internally installed in or externally installed on the electron telescope.

FIG. 1 is a schematic view of an embodiment of the architecture of an image extraction apparatus comprising a GPS receiver.

Image extraction apparatus 100 comprises a lens 110, a sensor 120, a DSP unit 130, a microprocessor 140, a storage medium 150, an input device 160, and a display device 170. Additionally, a GPS receiver 180 is externally installed on (or internally installed in) image extraction apparatus 100 and image extraction apparatus 100 can obtain longitude and latitude corresponding to a current location of image extraction apparatus 100 through GPS receiver 180. Microprocessor 140 checks a database 190 of storage medium 150 according to the longitude and latitude and selects ecological data according to comparison results. Storage medium 150 comprises multiple ecological category databases (not shown) storing ecological data of animals, plants, minerals, and so on, respectively. Additionally, when image extraction apparatus 100 does not operate, it acts in a satellite navigation mode to repeatedly obtain ecological data according to longitude and latitude corresponding to a current location thereof.

Next, when a switch signal from input device 160 is received, microprocessor 140 switches image extraction apparatus 100 from a satellite navigation mode to a shooting mode to take images. When a shooting signal from input device 160 is received, microprocessor 140 enables sensor 120 to receive an ecological image (a bird image, for example) through lens 110, obtains longitude and latitude corresponding to a current location of image extraction apparatus 100, and retrieves ecological data from storage medium 150 according to the longitude and latitude. Next, DSP unit 130 compares the ecological image with ecological data corresponding to the longitude and latitude and microprocessor 140 displays comparison results in display device 170.

Another workflow for image extraction apparatus 100 of the invention is described in the following, in which ecological data is not pre-downloaded and stored in storage medium 150.

When image extraction apparatus 100 acts in a satellite navigation mode, microprocessor 140 receives a switch signal from input device 160 and switches image extraction apparatus 100 from a satellite navigation mode to a shooting mode. When a shooting signal from input device 160 is received, microprocessor 140 enables sensor 120 to receive an ecological image (a bird image, for example) through lens 110. Next, DSP unit 130 receives the ecological image and obtains longitude and latitude corresponding to a current location of image extraction apparatus 100 through GPS receiver 180. Microprocessor 140 retrieves ecological data from database 190 through GPS receiver 180 and stores the ecological data in storage medium 150. DSP unit 130 compares the ecological image with ecological data corresponding to the longitude and latitude and microprocessor 140 displays comparison results in display device 170.

In the embodiment, image extraction apparatus 100 is an electron telescope, a digital camera or other image devices capable of shooting. GPS receiver 170 is internally installed in or externally installed on image extraction apparatus 100, as shown in Attachment 1. Storage medium 150, a hard disk drive or memory (flash memory, for example), is installed in image extraction apparatus 100. Additionally, image extraction apparatus 100 can externally connect to a memory card or an external hard disc, which retrieves ecological data corresponding to obtained longitude and latitude from a data compact disc via a computer device or from a remote database through a network (the Internet or a local area network). The retrieved ecological data is stored in storage medium 150 and image extraction apparatus 100 retrieves data therefrom according to longitude and latitude thereof for comparison.

Figure 2:
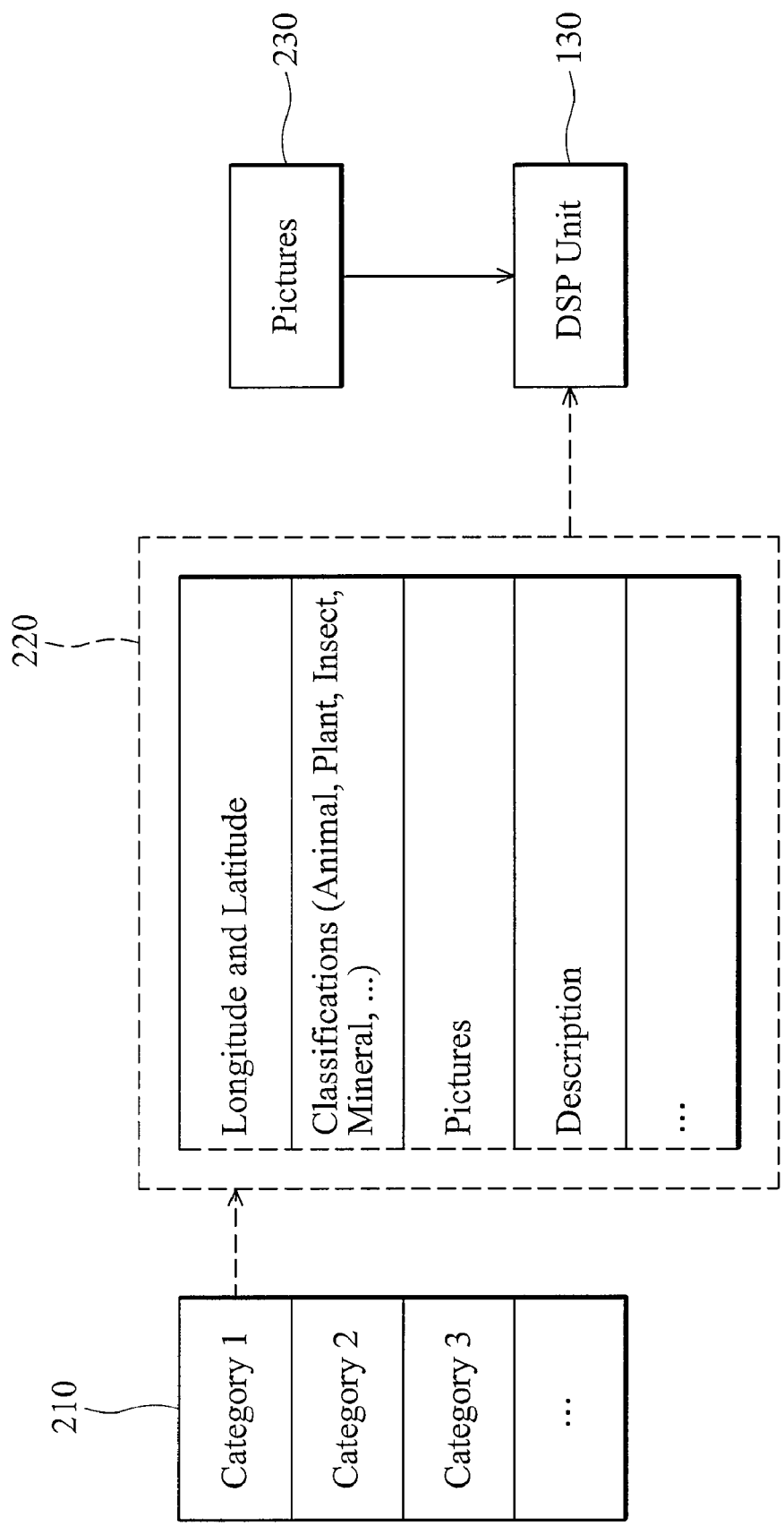
FIG. 2 is a schematic view of data downloading and comparing for the image extraction apparatus shown in FIG. 1.

FIG. 2 is a schematic view of data downloading and comparing for the image extraction apparatus shown in FIG. 1.

As described, a storage medium comprises multiple ecological category databases storing ecological data of animals, plants, minerals, and so on, respectively. A bird database comprises multiple bird categories 210, comprising category 1, category 2, category 3, and so on. Each bird category further comprises data content 220, comprising longitude and latitude where a bird appears, classifications (such as animal, plant, insect, mineral, and the like), pictures, description, and so forth. When a bird image is obtained, DSP unit 130 retrieves bird data corresponding to the longitude and latitude from storage medium 150 or database 190, compares pictures 230 of each bird data, and displays desired bird data. Additionally, the database described can be remotely located to retrieve ecological data therefrom through a GPS receiver or internally installed in image extraction apparatus 100.

Figure 3:
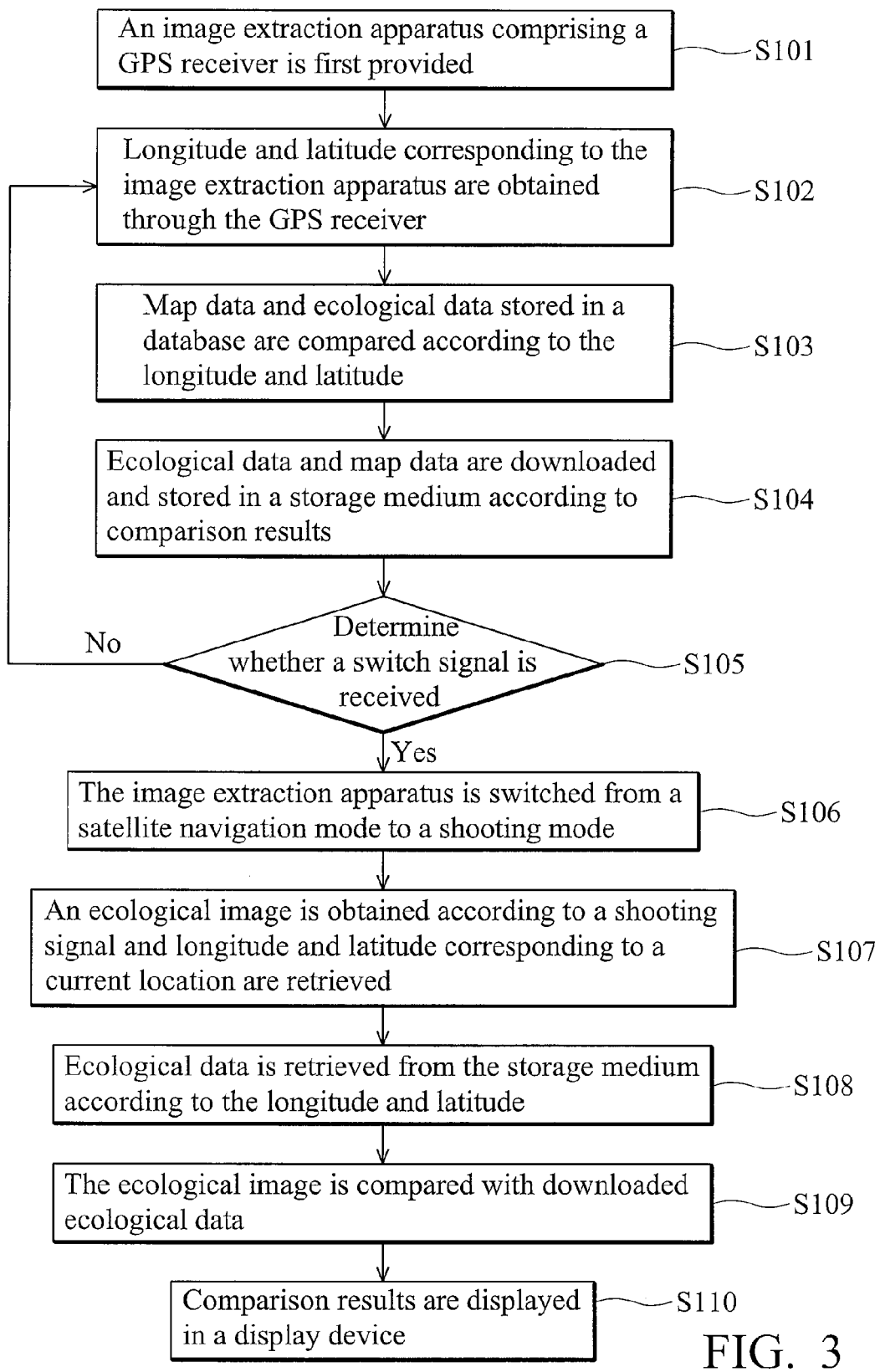
FIG. 3 is a flowchart of an embodiment of an image processing method for an image extraction apparatus comprising a GPS receiver.

FIG. 3 is a flowchart of an embodiment of an image processing method for an image extraction apparatus comprising a GPS receiver.

An image extraction apparatus comprising a GPS receiver is first provided (step S101). Longitude and latitude corresponding to the image extraction apparatus are obtained through the GPS receiver (step S102). Map data and ecological data stored in a database are compared according to the longitude and latitude (step S103). Ecological data and map data are downloaded and stored in a storage medium of the image extraction apparatus according to comparison results (step S104). The storage medium comprises multiple ecological databases. It is determined whether a switch signal is received (step S105). If so, the image extraction apparatus is switched from a satellite navigation mode to a shooting mode (step S106), and, if not, the process proceeds to step S102. Next, an ecological image is obtained according to a shooting signal and longitude and latitude corresponding to a current location of the image extraction apparatus are retrieved (step S107). Ecological data is retrieved from the storage medium according to the longitude and latitude corresponding to the current location of the image extraction apparatus (step S108). The ecological image is compared with downloaded ecological data (step S109) and comparison results are displayed in a display device (step S110).

Figure 4:
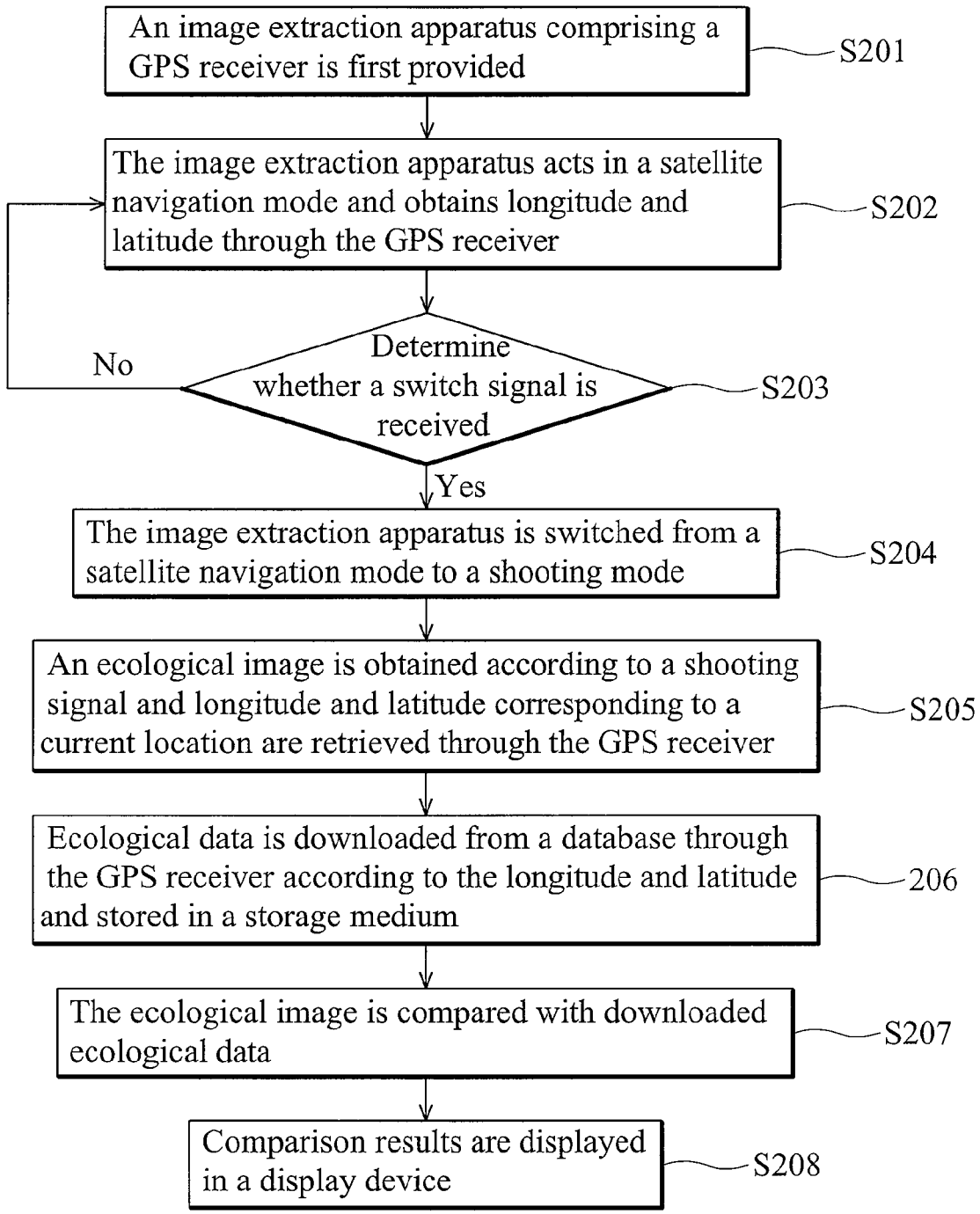
FIG. 4 is a flowchart of another embodiment of an image processing method for an image extraction apparatus comprising a GPS receiver.

FIG. 4 is a flowchart of another embodiment of an image processing method for an image extraction apparatus comprising a GPS receiver.

An image extraction apparatus comprising a GPS receiver is first provided (step S201). The image extraction apparatus acts in a satellite navigation mode and obtains longitude and latitude corresponding to the image extraction apparatus through the GPS receiver (step S202). It is determined whether a switch signal is received (step S203). If so, the image extraction apparatus is switched from a satellite navigation mode to a shooting mode (step S204), and, if not, the process proceeds to step S201. Next, an ecological image is obtained according to a shooting signal and longitude and latitude corresponding to a current location of the image extraction apparatus are retrieved through the GPS receiver (step S205). Ecological data is downloaded from a database through the GPS receiver according to the longitude and latitude corresponding to the current location of the image extraction apparatus and stored in a storage medium of the image extraction apparatus (step S206). The storage medium comprises multiple ecological databases. The ecological image is compared with downloaded ecological data (step S207) and comparison results are displayed in a display device (step S208).

Additionally, an image extraction apparatus of an embodiment of the invention can execute data searching using a button or an option item applied in an application when it acts in a satellite navigation mode. Next, the image extraction apparatus extracts ecological data based on positioning according to longitude and latitude and classifies and downloads data. Further, the image extraction apparatus displays a shot image and ecological data for comparison and is returned to the satellite navigation mode using a button or an option item when the data comparison terminates.

Furthermore, DSP unit 130 of the invention compares an ecological image with ecological data corresponding to located longitude and latitude. The comparison operation comprises displaying a shot object and downloaded ecological images using cut frames and comparing the downloaded ecological images by DSP unit 130 to recognize the shot object.

Another embodiment of an image extraction apparatus comprising a GPS receiver retrieves ecological data and map data corresponding to the current location using a GPS receiver, enabling users to know the ecological distribution of animals and plants, and rapidly locate ecological data corresponding to a shot image.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image extraction apparatus comprising a GPS receiver, comprising:
    a lens;
    a sensor;
    a display device;
    a storage medium, comprising an ecological database;
    an input device;
    a GPS receiver;
    a DSP unit; and
    a microprocessor, when a shooting signal from the input device is received, enabling the sensor to receive an ecological image through the lens and transmitting the ecological image to the DSP unit, obtaining longitude and latitude corresponding to a current location of the image extraction apparatus through the GPS receiver, retrieving ecological data from the ecological database according to the longitude and latitude, enabling the DSP unit to compare the ecological image and the ecological data, and displaying comparison results on the display device.

2. The image extraction apparatus as claimed in claim 1, wherein the microprocessor switches the image extraction apparatus from a satellite navigation mode to a shooting mode when a switch signal is received.

3. The image extraction apparatus as claimed in claim 1, wherein ecological data stored in the ecological database can be pre-loaded using an external computer system or an external storage medium or immediately downloaded using the GPS receiver.

4. The image extraction apparatus as claimed in claim 1, wherein the GPS receiver is internally installed in or externally installed on the image extraction apparatus.

5. An image extraction apparatus comprising a GPS receiver, comprising:
    a lens;
    a sensor;
    a display device;
    a storage medium;
    an input device;
    a GPS receiver;
    a DSP unit; and
    a microprocessor, when a shooting signal from the input device is received, comprising enabling the sensor to receive an ecological image through the lens and transmitting the ecological image to the DSP unit, obtaining longitude and latitude corresponding to a current location of the image extraction apparatus through the GPS receiver, retrieving ecological data from a remote database according to the longitude and latitude and storing the retrieved ecological data in the storage medium, enabling the DSP unit to compare the ecological image and the ecological data, and displaying comparison results on the display device.

6. The image extraction apparatus as claimed in claim 5, wherein the microprocessor switches the image extraction apparatus from a satellite navigation mode to a shooting mode when a switch signal is received.

7. The image extraction apparatus as claimed in claim 5, wherein the GPS receiver is internally installed in or externally installed on the image extraction apparatus.

8. An image processing method for an image extraction apparatus comprising a GPS receiver, comprising:
    providing an image extraction apparatus comprising a GPS receiver;
    obtaining longitude and latitude corresponding to the image extraction apparatus through the GPS receiver;
    comparing map data and ecological data stored in a database according to the longitude and latitude;
    downloading ecological data and map data to a storage medium of the image extraction apparatus according to comparison results;

switching the image extraction apparatus from a satellite navigation mode to a shooting mode when a switch signal is received;

obtaining an ecological image according to a shooting signal and longitude and latitude corresponding to a current location of the image extraction apparatus;

retrieving ecological data from the storage medium according to the longitude and latitude corresponding to the current location of the image extraction apparatus; and comparing the ecological image and downloaded ecological data and displaying comparison results in a display device.

9. The image extraction method as claimed in claim 8, wherein the GPS receiver is internally installed in or externally installed on the image extraction apparatus.

10. An image processing method for an image extraction apparatus comprising a GPS receiver, comprising:

providing an image extraction apparatus comprising a GPS receiver and obtaining longitude and latitude corresponding to the image extraction apparatus through the GPS receiver;

switching the image extraction apparatus from a satellite navigation mode to a shooting mode when a switch signal is received;

obtaining an ecological image according to a shooting signal and longitude and latitude corresponding to a current location of the image extraction apparatus through the GPS receiver;

downloading ecological data from a database through the GPS receiver according to the longitude and latitude corresponding to the current location of the image extraction apparatus and storing the ecological data in a storage medium of the image extraction apparatus; and comparing the ecological image and downloaded ecological data and displaying comparison results in a display device.

11. The image extraction method as claimed in claim 10, wherein the GPS receiver is internally installed in or externally installed on the image extraction apparatus.

* * * * *